(12) United States Patent
Wang et al.

(10) Patent No.: US 11,334,482 B2
(45) Date of Patent: May 17, 2022

(54) UPGRADING ON-DISK FORMAT WITHOUT SERVICE INTERRUPTION

(71) Applicant: VMware, Inc., Palo Alto, CA (US)

(72) Inventors: Wenguang Wang, Santa Clara, CA (US); Vamsi Gunturu, Cupertino, CA (US)

(73) Assignee: VMWARE, INC., Santa Clara, CA (US)

( * ) Notice: Subject to any disclaimer, the term of this patent is extended or adjusted under 35 U.S.C. 154(b) by 0 days.

(21) Appl. No.: 16/933,162

(22) Filed: Jul. 20, 2020

(65) Prior Publication Data

US 2022/0019528 A1 Jan. 20, 2022

(51) Int. Cl.
*G06F 12/06* (2006.01)

(52) U.S. Cl.
CPC .. *G06F 12/0646* (2013.01); *G06F 2212/1004* (2013.01)

(58) Field of Classification Search
CPC .. G06F 12/0646; G06F 3/0607; G06F 3/0628; G06F 3/0634; G06F 3/0638; G06F 3/064; G06F 3/0647; G06F 3/0662; G06F 3/0667; G06F 2212/1004
See application file for complete search history.

(56) References Cited

U.S. PATENT DOCUMENTS

| | | | | |
|---|---|---|---|---|
| 9,952,782 | B1* | 4/2018 | Chandrasekaran ... | G06F 3/0665 |
| 2002/0049825 | A1* | 4/2002 | Jewett ................... | H04L 69/329 709/215 |
| 2015/0081994 | A1* | 3/2015 | Christopher ............ | G06F 16/00 711/162 |
| 2018/0121129 | A1* | 5/2018 | Sawhney .............. | G06F 3/0604 |

OTHER PUBLICATIONS

Related to pending U.S. Appl. No. 16/933,183, filed Jul. 20, 2020.

* cited by examiner

*Primary Examiner* — Tracy A Warren

(57) ABSTRACT

A logical map represents fragments from separate versions of a data object. Migration of data from a first (old) version to the second (new) version happens gradually, where write operations go to the new version of the data object. The logical map initially points to the old data object, but is updated to point to the portions of the new data object as write operations are performed on the new data object. A background migration copies data from the old data object to the new data object.

20 Claims, 11 Drawing Sheets

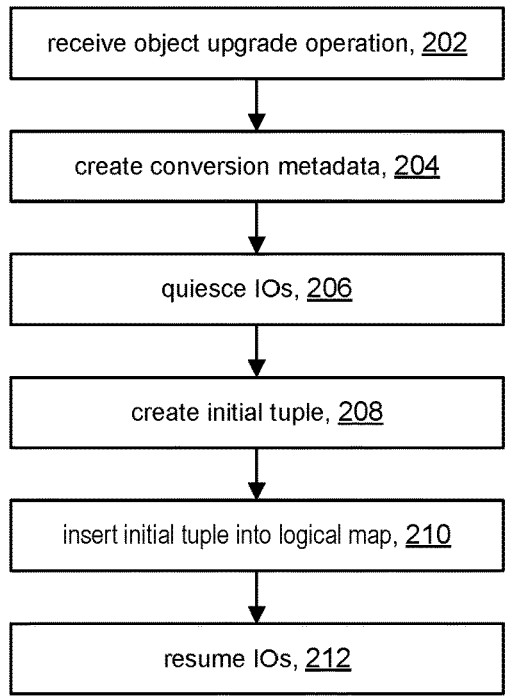
FIG. 2
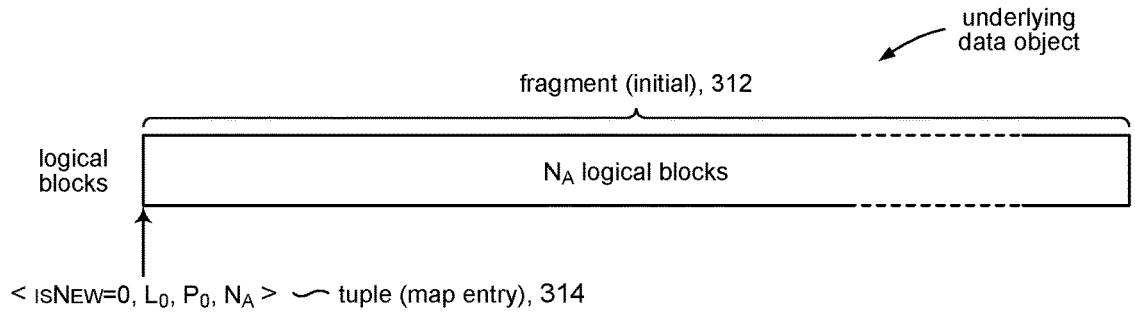
FIG. 3A
FIG. 3B
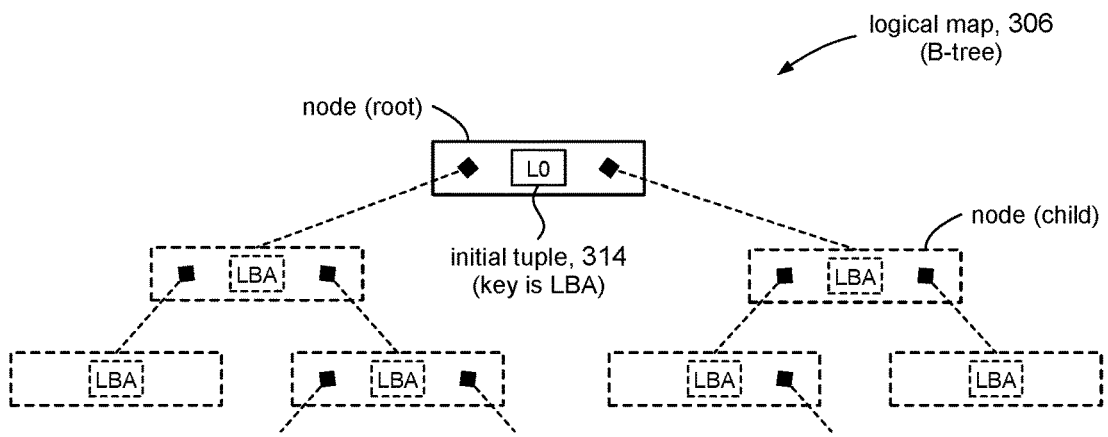
FIG. 3C

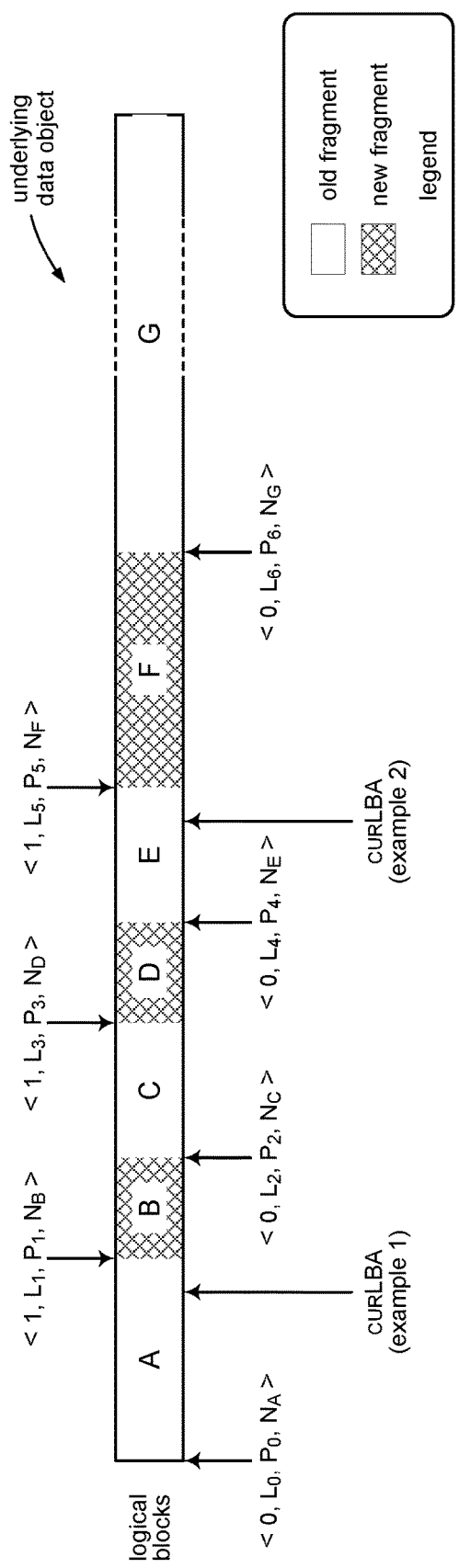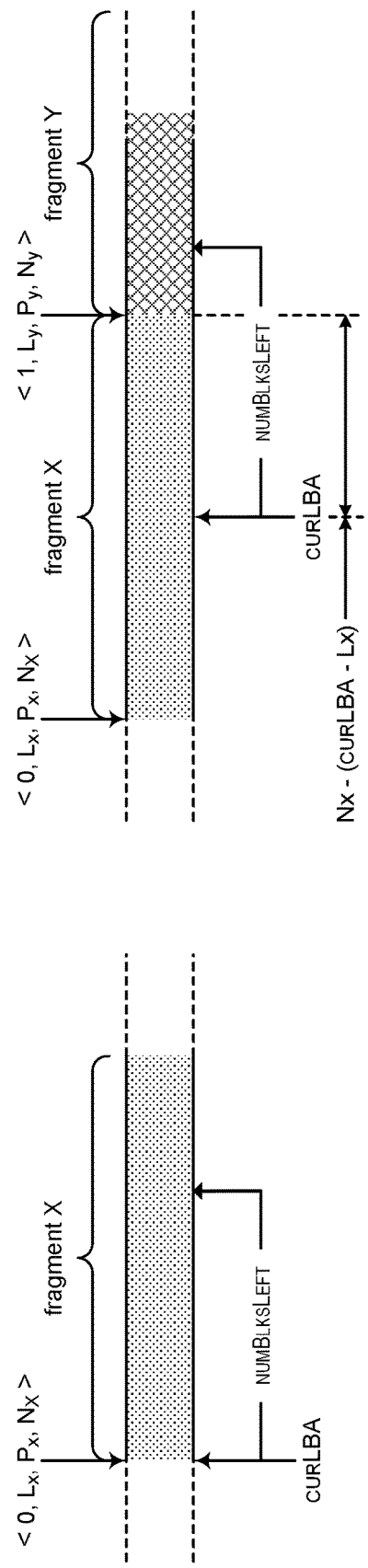

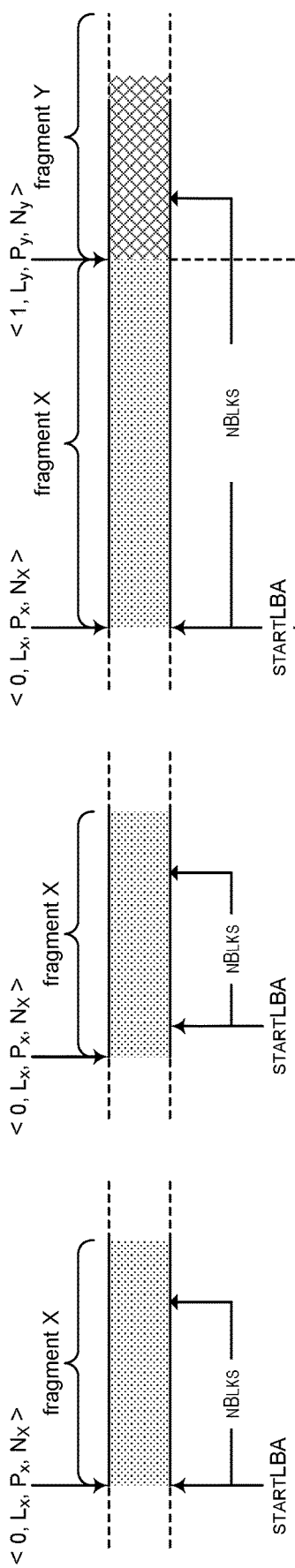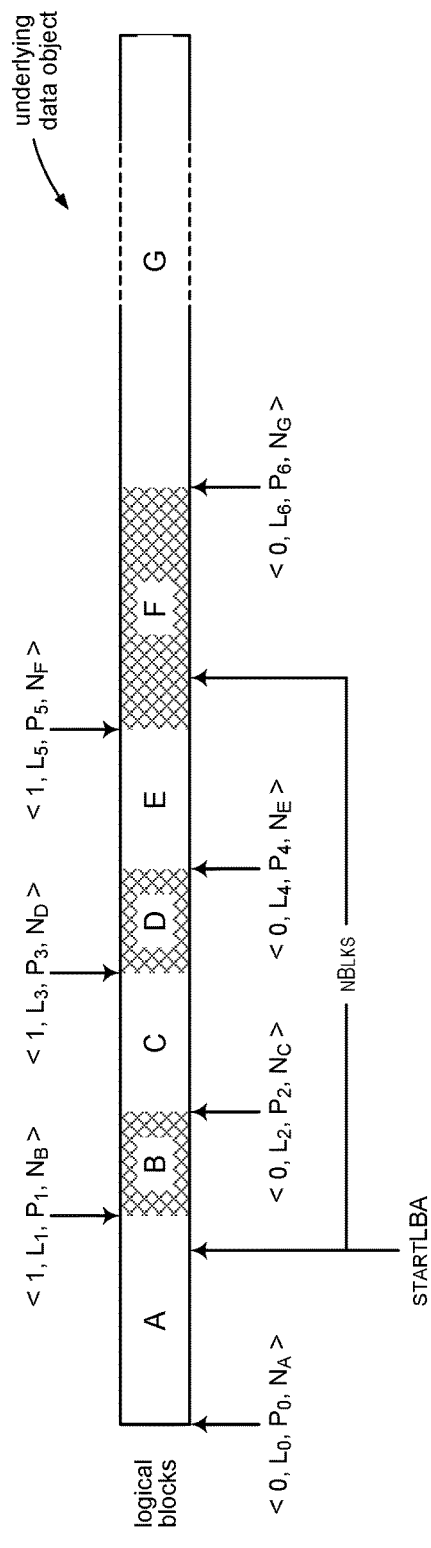
FIG. 10A
FIG. 10B
FIG. 10C
FIG. 10D

UPGRADING ON-DISK FORMAT WITHOUT SERVICE INTERRUPTION

CROSS REFERENCE TO RELATED APPLICATIONS

This application is related to U.S. application Ser. No. 16/933,183, filed Jul. 20, 2020, the content of which is incorporated herein by reference in its entirety for all purposes.

BACKGROUND

When new features are introduced to enterprise storage systems, a new incompatible on-disk format may accompany the new feature. This necessitates converting data comprising an underlying data object that is stored in one format to storage in another format. An example is the underlying data object can be a virtual disk in a virtualization system. The old format of the disk may be configured as redundant array of independent disks (RAID), for example a RAID-6 array with 4 megabyte (MB) data stripes, while the new format has 1 terabyte (TB) data stripes.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 illustrates processing in response to an object update operation in accordance with the present disclosure.

FIG. 3A shows a logical map in accordance with the present disclosure.

FIG. 3B shows the logical blocks of an underlying data object in accordance with the present disclosure.

FIG. 3C shows an example of storing a logical map in accordance with the present disclosure.

FIG. 8 shows an example of a logical map in connection with a read operation in accordance with the present disclosure.

FIGS. 9A and 9B shows examples for computing a range for reading in accordance with the present disclosure.

FIGS. 10A-10D show examples of read operations.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1B:
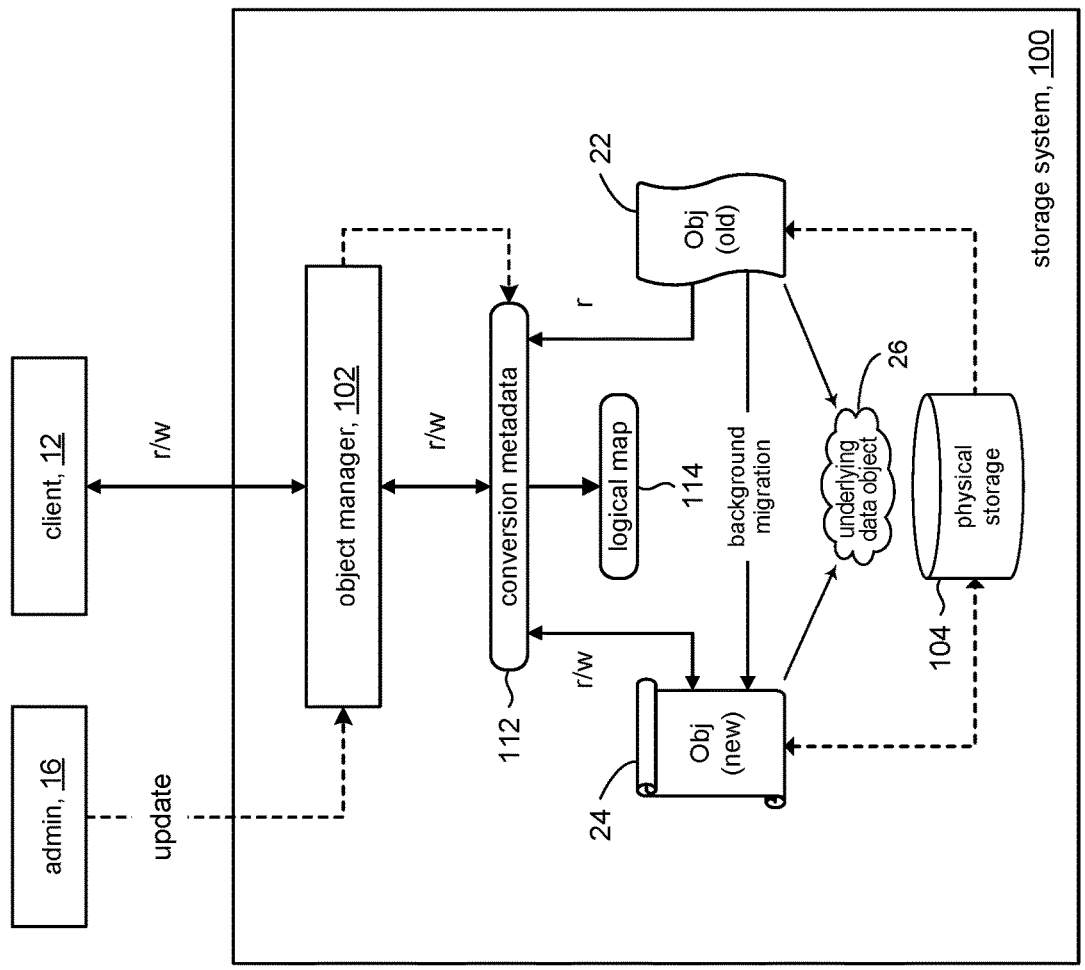
FIGS. 1A and 1B illustrate a storage system in accordance with the present disclosure.
Figure 1A:
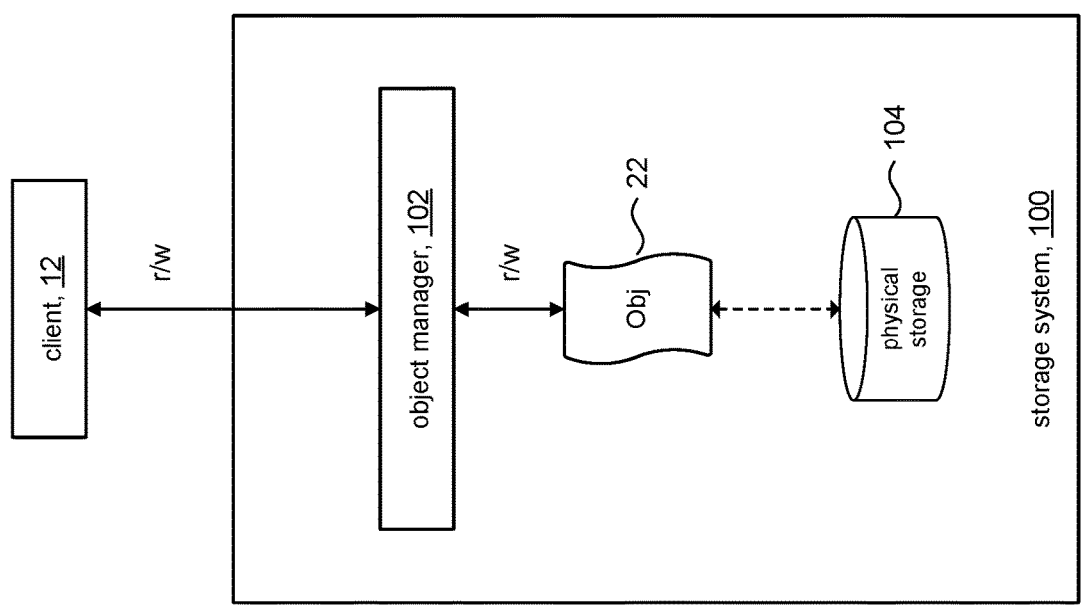

FIGS. 1A and 1B show a storage system in accordance with some embodiments of the present disclosure. Referring to FIG. 1A, storage system 100 can be accessed by client 12 to perform input/output (IO) operations such as CREATE( ), READ( ), WRITE( ), and the like. The storage system 100 can include an object manager 102 to manage data object 22 in accordance with the present disclosure. Storage system 100 can include a physical storage subsystem 104. In some embodiments, physical storage subsystem 104 can comprise any suitable data storage architecture including, but not limited to, a system or array of hard disk storage devices (e.g., hard disk drives, HDDs), solid-state devices (SSDs), NVMe (non-volatile memory express) devices, persistent memory, and so on.

In some embodiments, client 12 can be a virtual machine executing on a host (not shown). Data object 22 can be a virtual disk that is configured from storage system 100, and from which the virtual machine (client 12) boots up. It will be appreciated that in other embodiments, client 12 is not necessarily a virtual machine and in general can be any computer system. Likewise, data object 22 does not necessarily represent a virtual disk and in general can represent any kind data. However, data object 22 will be treated as a virtual disk object in order to provide a common example for discussion purposes.

Referring now to FIG. 1B, a system administrator 16 can access storage system 100, for example, to perform various maintenance activities on the storage system. The figure shows the system administrator performing an update operation on "old" data object 22 (first version) to create "new" data object 24 (second version). Merely to illustrate, for example, suppose the virtual disk that data object 22 represents is configured as a RAID-6 array with 4 MB data stripes. The update operation may include changing the disk configuration to a RAID-6 array with 16 TB data stripes. Another example of a format change might involve changing from a RAID-1, two-way mirror configuration to a RAID-1, two-way mirror with a log-structured file system. Generally, data object 22 can be updated in a way that involve changing the way the data comprising the data object is physically stored.

In accordance with the present disclosure, the object manager 102 can create, in response to an update operation, a new data object 24 having the new format. Referring to the example above, for instance, the new data object can represent a virtual disk with a configuration different from the virtual disk configuration represented by the old data object 22. Object manager 102 can create conversion metadata 112 to manage converting old data object 22 to new data object 24 in accordance with the present disclosure. Conversion metadata 112 can include a logical map 114 and pointers to old data object 22 and new data object 24.

It is worth pointing out that the old data object and the new data object refer to the same underlying data object 26 and the same set of logical blocks comprising the underlying data object. For example, if the underlying data object 26 is a database, the old and new data objects both refer to the same underlying database and logical blocks comprising that database. In other words, for instance, logical block 123 in the old data object is the same as on the new data object; the difference is that the data of the logical block 123 can be stored on physical storage for the old data object or on physical storage for the new data object. The references to "old" and "new" in old data object 22 and new data object 24, respectively, refer to the way (e.g., format) in which the underlying data object 26 is stored. For example, the old data object 22 may represent a virtual disk that stores the data blocks of the underlying data object in one disk format, while the new data object 24 may represent a virtual disk that uses a different disk format to store those same data blocks of the underlying data object.

FIG. 1B shows that physical storage subsystem 104 is used by both the old and new data objects as their physical storage. It will be appreciated that in other embodiments, separate physical data stores can be used.

Referring now to FIGS. 2 and 3A-3C, the discussion will turn to a high level description of processing in object manager 102 for creating conversion metadata 112 in accordance with the present disclosure in connection with converting data object 22. In some embodiments, for example, the storage system 100 may include computer executable program code, which when executed by a processor (e.g., 1402, FIG. 14), can cause the object manager to perform processing in accordance with FIG. 2. As explained above, for discussion purposes, data objects 22 and 24 will represent a virtual disk objects, but in general the data objects can represent other kinds of objects.

At operation 202, the object manager can receive an update operation on a data object, for example, from a system administrator. Suppose, for instance, the data object represents a virtual disk. The new feature may be incompatible with the disk format of the virtual disk data object and thus may involve converting the data object.

At operation 204, the object manager can create an instance of a conversion metadata data structure (e.g., 112) to manage the old data object (e.g., 22) and the new data object (e.g., 24). Referring for a moment to FIG. 3A, in some embodiments conversion metadata 112 can include a pointer 302 that is initialized by the object manager to point to the old data object and a pointer 304 that is initialized by the object manager to point to a newly allocated data object 24. In some embodiments, the old data structure can be a file in a file system on the physical storage subsystem 104 and pointer 302 can be a pathname to the file. Similarly, the new data structure can be another file in a different (or the same) file system and pointer 302 can be a pathname to the file. The conversion metadata 112 can include a logical map data structure 306, which is discussed in more detail below.

At operation 206, the object manager can quiesce all IO operations on the old data object. For example, all pending IOs are completed and no new IOs are accepted. This allows the old data object to become stable for the remaining operations.

At operation 208, the object manager can create an initial tuple (map entry) to be inserted into logical map 306. In accordance with the present disclosure, the logical map represents fragments of both the old data object and the new data object. Each fragment is comprised of one or several contiguous logical blocks of the underlying data object. Referring for a moment to FIG. 3B, the figure depicts the logical blocks of the underlying data object. Initially, all the logical blocks are in a single fragment 312 represented by tuple 314. The tuple can include an ISNEW flag, the logical block address (LBA) of the first logical block in a given fragment, a physical block address (PBA) of the physical location of that logical block on the physical storage subsystem 104, and the number of logical blocks in the given fragment. Logical blocks are numbered sequentially, i.e., block #0 (L0), block #1 (L1), block #2 (L2), and so on to block #n-1 ($L_{n-1}$) for a total of n blocks.

The ISNEW flag indicates whether the fragment is in the old data object or in the new data object. For discussion purposes, ISNEW==0 refers to old data object and ISNEW==1 refers to new data object. In the example in FIG. 3B, for instance, the initial tuple 314 represents the entire old data object, so the ISNEW flag is '0'. Recall from above that the old data object and the new data object refer to the same underlying data object and hence the same logical blocks. Accordingly, a logical block $LBA_x$ in the old data object is the same as logical block $LBA_x$ in the new data object. The qualifiers "old" and "new" refer, respectively, to the old and new formats of the data objects; e.g., RAID-6 with 4 MB data stripes vs. RAID-6 with 1 TB data stripes. For example, the tuple:

$$<\text{ISNEW}, L_{123}, P_{123}, N_x>$$

represents a fragment of the underlying data object that has $N_x$ logical blocks (logical blocks $L_{123}$ to $L_{123+Nx-1}$), where the first logical block in the fragment is logical block $L_{123}$ (logical block #123). If the ISNEW flag is 0, then the physical block address (PBA) $P_{123}$ refers to the location, in physical storage where the original (old) data object is physically stored, that contains the data for logical block $L_{123}$; in other words, we can say the fragment is on the old data object or that its LBA is on the old data object. Similarly, if the ISNEW flag is 1, then $P_{123}$ refers to the location of the data for logical block $L_{123}$ in physical storage where the new data object is physically stored; in other words, we can say the fragment is on the new data object or that the PBA is on the new data object.

As mentioned above, tuple 314 is the initial tuple that represents the entire old data object as a single fragment 312, and is expressed as:

$$<\text{ISNEW} \leftarrow 0, L_0, P_0, N_A>,$$

where the old data object comprises a total of $N_A$ logical blocks.

Continuing with FIG. 2 at operation 210, the object manager can insert the initial tuple 314 into logical map 306. Referring for a moment to FIG. 3C, in some embodiments, the logical map 306 can be structured as a B-tree for efficient insertion and retrieval operations. It will be appreciated, however, that the logical map can be stored using other data structures; e.g., LSM-tree, $B^\varepsilon$-tree, binary search tree, hash list, etc. B-trees are well understood data structures including their various access functions such as INSERT, SEARCH, and DELETE. In some embodiments, the LBA in the tuple can be used as the key for insertion and search operations with the B-tree. FIG. 3C shows the first insertion of initial tuple 314 into the logical map using the LBA=0 as the insertion key. Subsequent insertions will populate the B tree in a manner according the degree of the B-tree and the specific insertion and traversal algorithm implemented for the B-tree.

At operation 212, the object manager can resume processing of IOs to receive read and write operations.

Figure 4:
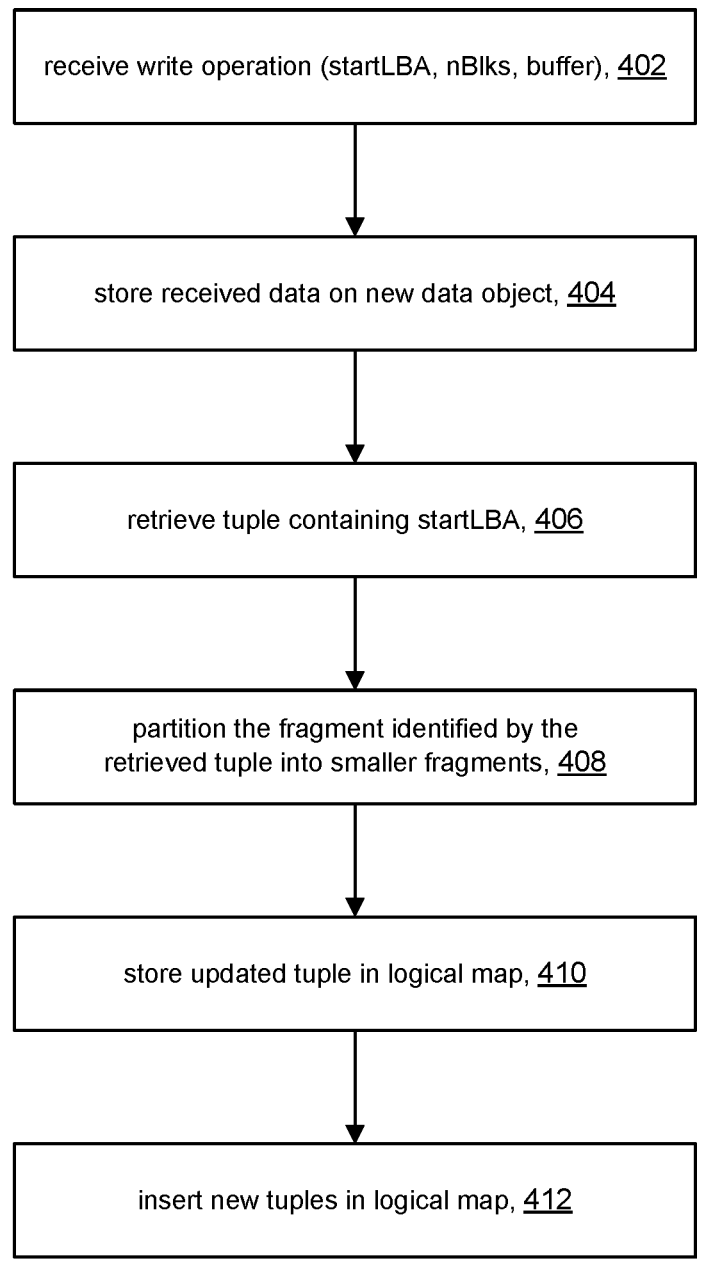
FIG. 4 illustrates processing in response to a write operation in accordance with the present disclosure.
Figure 5A:
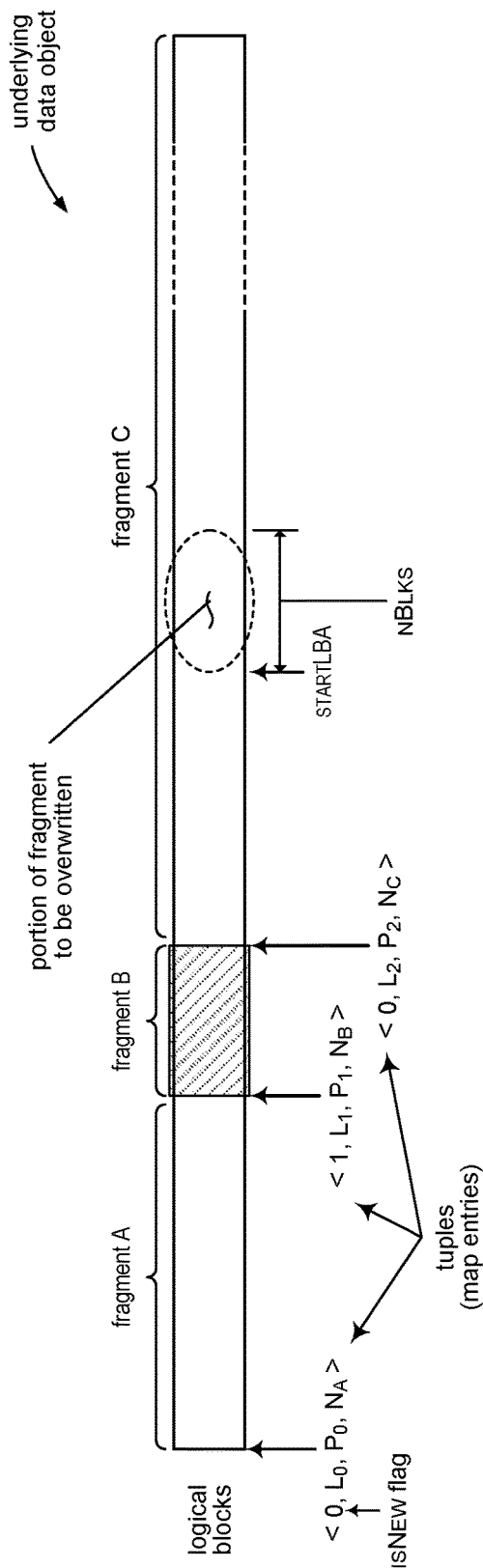
FIGS. 5A and 5B illustrate processing of a logical map during a write operation in accordance with the present disclosure.
Figure 5B:
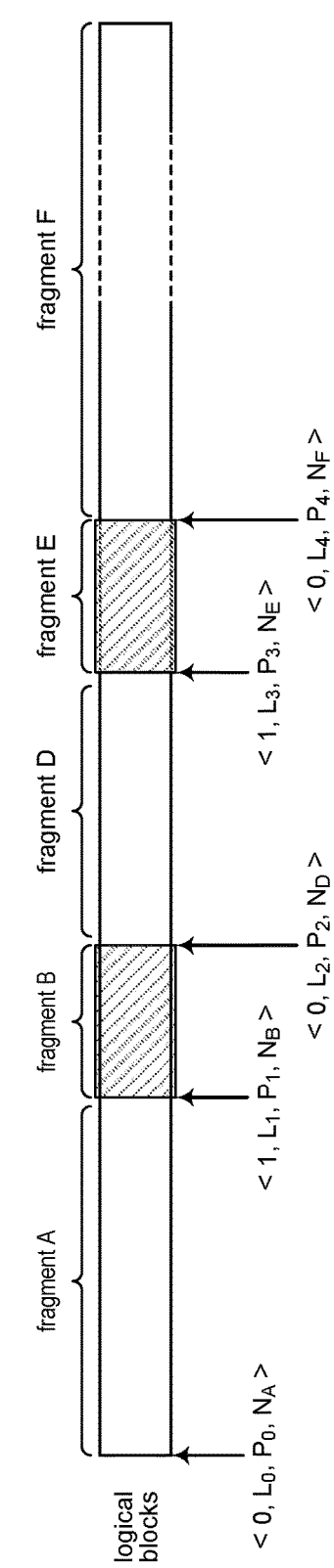

Referring to FIGS. 4, 5A, and 5B, the discussion will now turn to a high level description of processing in object manager 102 for writing data to a data object in accordance with the present disclosure during conversion of the data object. In some embodiments, for example, the storage system 100 can include computer executable program code, which when executed by a processor (e.g., 1402, FIG. 14), can cause the object manager to perform processing in accordance with FIG. 4. As explained above, for discussion purposes, data objects 22 and 24 will represent virtual disk objects, but in general the data objects can represent other kinds of objects.

At operation 402, the object manager can receive a write operation on the data object from a client. The write operation can include a STARTLBA parameter that identifies the first logical block to be written. The write operation can include an NBLKS parameter that informs the number of blocks to be written beginning at STARTLBA. The write operation can include a buffer that contains the data to be written (received data).

At operation 404, the object manager can store the received data in the logical blocks beginning with STARTLBA. However, in accordance with the present disclosure, the received data is not written to physical storage where the old data object is physically stored. Rather, in accordance with the present disclosure, the received data is written to physical storage where the new data object is physically stored. Accordingly, the NBLKS of received data can be written to physical storage. The object manager can now update the logical map to reflect the fact that the received data is written to the new data object.

At operation 406, the object manager can access the logical map (e.g., 306) to retrieve the tuple that contains STARTLBA. As explained above, in some embodiments the tuple includes the LBA of the first logical block in the fragment that the tuple represents. Accordingly, the logical map can be searched to find the tuple with the largest LBA that is less than or equal to STARTLBA. Consider the example of logical blocks for an underlying data object shown in FIG. 5A. The logical map includes the following tuples:

$$<0,L_0,P_0,N_A>$$

$$<1,L_1,P_1,N_B>$$

$$<0,L_2,P_2,N_C>.$$

Although the logical map is shown as a list of tuples, in some embodiments, the tuples can be stored in a B-tree (FIG. 3C) or in some other data structure. FIG. 5A shows the logical blocks of the underlying data object are grouped into three fragments. Each fragment is identified by a corresponding tuple in the logical map. For example, fragment A is identified by the tuple:

$$<0,L_0,P_0,N_A>,$$

where the ISNEW flag is 0 which indicates that fragment A is in the old data object. The first logical block in fragment A is $L_0$ and the number of blocks in fragment A is $N_A$. The physical block address $P_0$ is the location of $L_0$ in physical storage where the old data object is stored. Likewise for fragment C. Fragment B is identified by the tuple:

$$<1,L_1,P_1,N_B>,$$

where the ISNEW flag is 1 which indicates that fragment B is in the new data object. The first logical block in fragment B is $L_1$ and the number of blocks in fragment B is $N_B$. $P_1$ is the location of $L_1$ in physical storage where the new data object is stored.

Continuing with operation 406 in FIG. 4, the example in FIG. 5A shows that the write operation targets a portion of fragment C of the old data object. Accordingly, the tuple with the largest LBA that is less than or equal to STARTLBA is the tuple $<0, L_2, P_2, N_C>$, the tuple for fragment C.

At operation 408, the object manager can partition the fragment identified by the tuple retrieved at operation 406. Continuing with the example shown in FIG. 5A and referring to FIG. 5B, because the write operation targets a portion of fragment C, the fragment is partitioned into three smaller fragments, fragment D, fragment E, and fragment F.

Fragment E is the target of the write operation and is a fragment in the new data object. A new tuple is created to identify fragment E. The ISNEW flag is set to 1 to indicate the fragment is in the new data object. The LBA is set to STARTLBA. As for the physical block address, it was explained above that the NBLKS of data in the write operation can be written to physical storage. The physical block address of the first block of data written can be the physical address in the tuple. The tuple for fragment E can be expressed as:

$$<1,L_3,P_3,N_E>$$

where $L_3$ is STARTLBA, $P_3$ is the physical address of the first block of data written to physical storage, and $N_E$ is set to NBLKS.

Fragments D and F are the remaining portions of the old fragment C in the old data object that were not overwritten by the write operation. Fragment D starts where fragment C started and ends where fragment E begins, as can be seen in FIG. 5B. The tuple for fragment D is:

$$<1,L_2,P_2,N_D>$$

where ND can be computed as the difference $(L_3-L_2)$.

Similarly, fragment F starts where fragment E ends and ends where fragment C ended. The tuple for fragment F is:

$$<1,L_4,P_4,N_F>$$

where $L_4$ can be computed as the sum $(L_3+N_E)$, and $N_F$ can be computed as $(N_C-(N_D+N_E))$.

In some embodiments, the old data object can be allocated on physical storage as one large block of physical data blocks, in which case the physical data blocks are contiguous and sequential. Accordingly, the physical address $P_4$ in the tuple for fragment F can be computed as:

$$P_2+\text{PBLKSIZE}\times(N_D+N_E)$$

where PBLKSIZE is the physical block size of the physical storage where the old data object is stored.

At operation 410, the object manager can update the tuple obtained for fragment C to reflect the new size of the partitioned fragment. In some embodiments, the tuple can be retrieved from the logical map, modified to correspond to fragment D, and stored back to the logical map.

At operation 412, the object manager can insert the new tuples for fragments E and F. In the case of a B-tree (FIG. 3C), the tuples can be inserted into the B-tree using their respective LBAs as the insertion keys. Processing of the write operation can be deemed complete.

Figure 6:
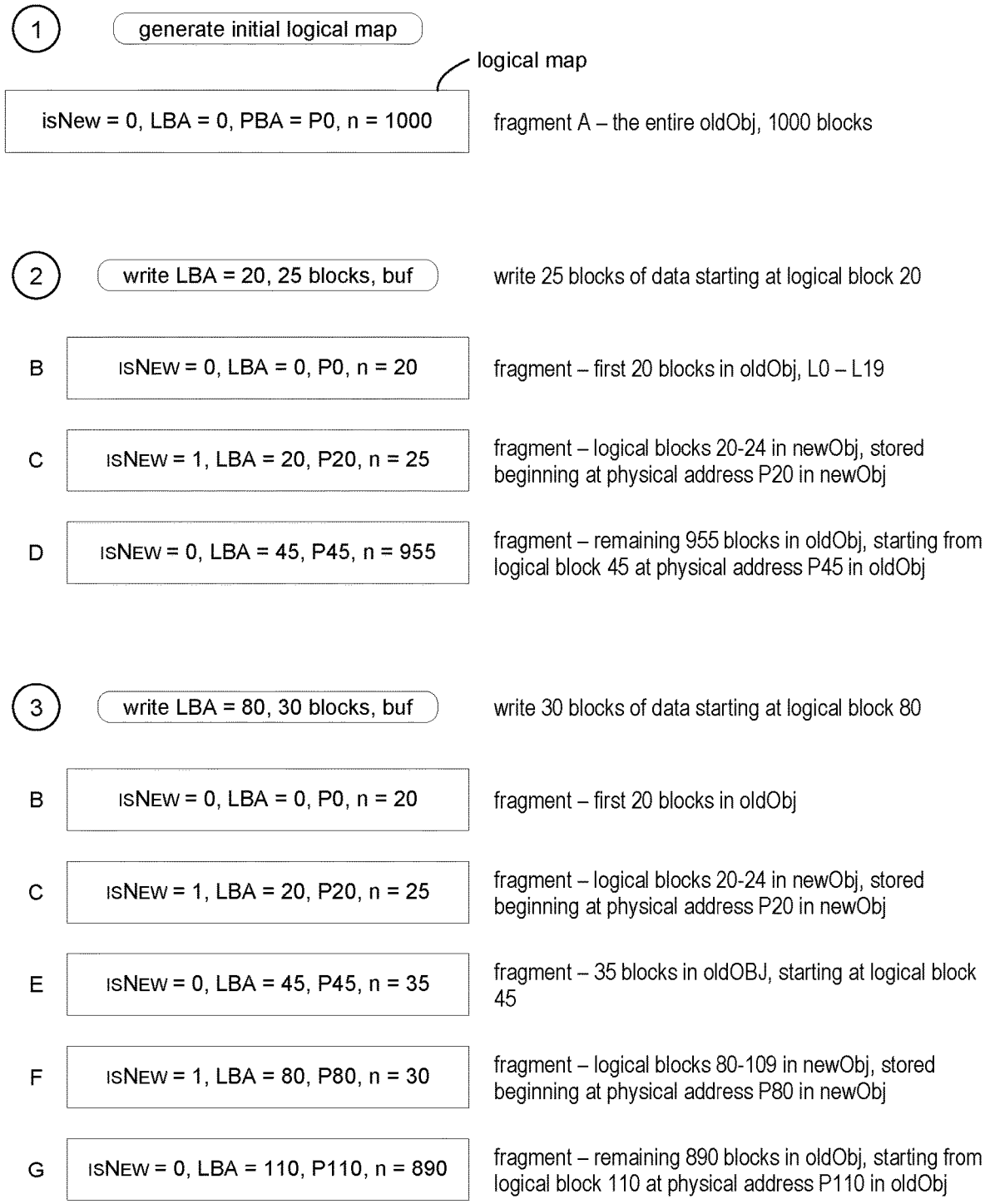
FIG. 6 shows an example of the development of a logical map in accordance with the present disclosure.
Figure 7:
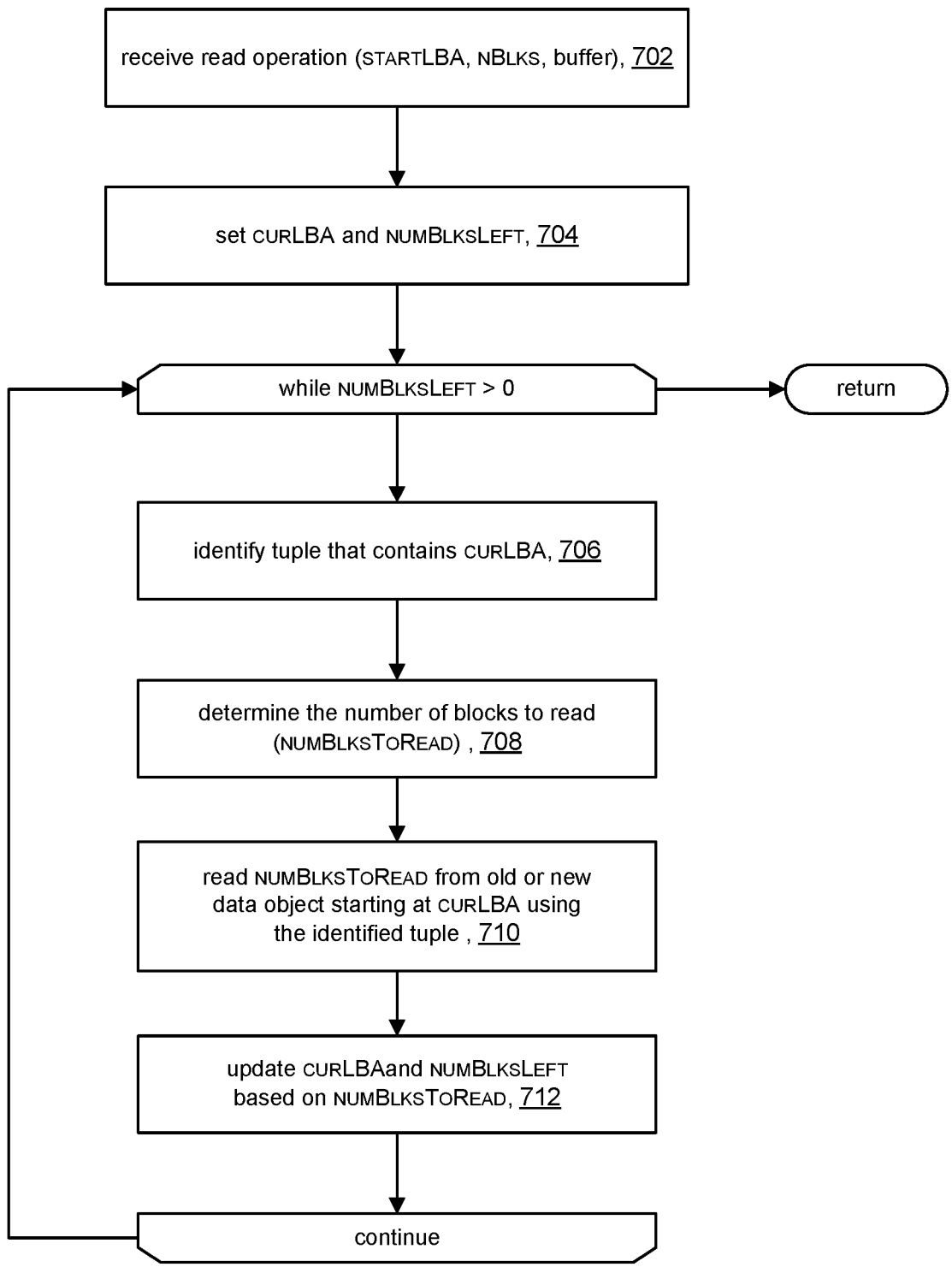
FIG. 7 illustrates processing in response to a read operation in accordance with the present disclosure.

FIG. 6 illustrates an example of processing a logical map (e.g., by the object manager) for a write operation in accordance with the present disclosure. The example shows three points in time, indicated by the circled time indices. Time index 1 shows the object manager generates the initial instance of a logical map in response to receiving an update operation. The logical map initially contains a single tuple which represents the underlying data object as a single fragment A consisting of all the logical blocks on the old data object.

Time index 2 shows the object manager receiving a write operation to write 25 blocks beginning at logical block 20 of the underlying data object. The initial fragment A is partitioned into smaller fragments according to the parameters of the write operation to reflect the fact that write operation is writing to a set of logical blocks in the middle of fragment A. Fragment A is partitioned into the three fragments B, C, and D as shown in FIG. 6. The logical blocks comprising fragment C contain the write data and are on the new data object. Fragment C can be identified by the tuple:

$<1, L20, P20, N25>,$ where L20 is the logical block address of the underlying data object and N25 refers to the 25 blocks of write data to be stored beginning at physical block P20 on the physical storage where the new data object is physically stored. The ISNEW flag is set to 1 to indicate that the data for this fragment is located on the physical storage for the new data object. The tuple for fragment C is new because its key (LBA=20) is not in the logical map. Accordingly, the tuple for fragment C is inserted into the logical map using 20 as the key.

The remaining fragments B and D comprise logical blocks that are still on the old data object. The tuple for D is new because its key (LBA=45) is not in the logical map. Accordingly, the tuple for fragment D is inserted into the logical map using 45 as the key. The tuple for B has the same key (LBA=0) as the tuple for the initial fragment A and differs only in the number of blocks. Because the tuple for the initial fragment A is already inserted in the logical map, that tuple can simply be modified in-place in the logical map to change the number of blocks from 1000 to 20. As can be seen in FIG. 6, the logical map at Time index 2 comprises the three tuples for fragments B, C, and D.

Time index 3 shows the object manager receiving a write operation to write 30 blocks beginning at logical block 80 of the underlying data object. A search of the logical map reveals that the tuple for fragment D will be retrieved because fragment D has the largest starting LBA (45) that is less than or equal to logical block 80. The parameters of the write operation show that the data to be written is in the middle of fragment D. Accordingly, D is partitioned into smaller fragments E, F, and G in a manner similar to fragment A described above. It can be seen that the logical map at Time index 3 comprises five tuples corresponding to fragments, B, C, E, F, and G.

Referring to FIGS. 7, 8, 9A, 9B, and 10A-10D, the discussion will now turn to a high level description of processing in object manager 102 for reading data from a data object in accordance with the present disclosure while the data object is being converted. In some embodiments, for example, the storage system 100 can include computer executable program code, which when executed by a processor (e.g., 1402, FIG. 14), can cause the object manager to perform processing in accordance with FIG. 7. As explained above, for discussion purposes, data objects 22 and 24 will represent virtual disk objects, but in general the data objects can represent other kinds of objects.

At operation 702, the object manager can receive a read operation on the data object from a client. The read operation can include a STARTLBA parameter that identifies the first logical block to be read. The read operation can include an NBLKS parameter that informs the number of blocks to be read starting from STARTLBA. The read operation can include a buffer to store the data to be read.

At operation 704, the object manager can set up some counters to process the read operation. In some embodiments, for instance, the read operation can processed in a loop. A CURLBA counter can track the current starting block for each iteration of the loop. CURLBA is initially set to the STARTLBA parameter in the read operation. A NUMBLKSLEFT counter can track the number of blocks to be read in a given iteration of the loop and is initially set to the NBLKS parameter in the read operation. CURLBA and NUMBLKSLEFT are updated with each iteration. The loop is iterated as long as there are blocks to be read; i.e., while NUMBLKSLEFT is greater than zero:

At operation 706, the object manager can identify the tuple that will be used in this iteration of the loop to read data from the data object. More specifically, the object manager obtains a tuple that contains CURLBA. In some embodiments, for example, the object manager can search the logical map for the tuple having the largest logical block address (LBA) that is less than or equal to CURLBA. The retrieved tuple represents the fragment that contains the blocks of data to be read in this iteration of the loop. Consider, for example, the configuration shown in FIG. 8. The logical blocks comprising the underlying data object are divided into old and new fragments, which are colored according to the legend. An "old" fragment refers to a tuple whose PBA is an address in the data store that physically stores the old data object. A "new" fragment refers to a tuple whose PBA is an address in the data store that physically stores the new data object. The logical map for this configuration comprises seven tuples:

$<0, L_0, P_0, N_A>$ $<1, L_1, P_1, N_B>$ $<0, L_2, P_2, N_C>$ $<1, L_3, P_3, N_D>$ $<0, L_4, P_4, N_E>$ $<1, L_5, P_5, N_F>$ $<0, L_6, P_6, N_G>$ which identify the fragments A-G in the figure. The logical map is depicted here as a linear list, but as mentioned above can be stored in a B-tree or other data structure.

The figure shows two examples of CURLBA to illustrate this operation. Each example points to a different positions in the data object. The position of CURLBA in example 1 will result in retrieving the tuple:

$<0, L_0, P_0, N_A>$ from the logical map because $L_0$ contains the largest LBA that is ≤CURLBA. The position of CURLBA in example 2 will result in retrieving the tuple:

$<0, L_4, P_4, N_E>$ from the logical map. Note that, for CURLBA in example 2, fragments A, B, C, and D are not selected because their respective LBAs, although less than CURLBA, do not meet the additional criterion of being the largest that is less than or equal to the value of CURLBA; fragment E meets the additional "largest" criterion.

Holes can be created in the data object during the life of the data object. For example, when data is deleted or moved holes in the logical blocks of the data object can form. These holes represent corner cases where no tuple may be found that contains curLBA. This aspect of the present disclosure is explained further below.

At operation 708, the object manager can determine how many blocks to read (numBlksToRead) using the tuple identified at operation 706. In some embodiments, numBlksToRead can be computed from the identified tuple using the values of curLBA and numBlksLeft. Suppose the tuple obtained at operation 706 is:

$$\langle 0, L_x, P_x, N_x \rangle$$

and represents fragment X in the data object. Fragment X has $N_x$ blocks and the first logical block in fragment X is $L_x$. The value of numBlksToRead can be computed as:

$$\text{numBlksToRead} \leftarrow \text{MIN}((N_x - (\text{curLBA} - L_x)), \text{numBlksLeft}).$$

Referring for a moment to an example in FIG. 9A, the example shows that curLBA and numBlksLeft specify a segment of logical blocks that fits entirely within fragment X. Accordingly, the number of blocks to read from fragment X (numBlksToRead) would be equal to the number of blocks remaining in the read operation (numBlksLeft) per the computation above. Referring now to FIG. 9B, an example shows that curLBA and numBlksLeft specify a segment of logical blocks that spans fragment X and fragment Y. Accordingly, the number of blocks from fragment X to read (numBlksToRead) would be $(N_x - (\text{curLBA} - L_x))$ as can be seen per the computation above.

As explained above, holes in the data object can arise, for example, when data is deleted or moved. These holes represent corner cases in the above computation for computing numBlksToRead. This aspect of the present disclosure is explained further below.

At operation 710, the object manager can read blocks of data from the tuple identified at operation 706. The isNew flag in the identified tuple informs the object manager which physical storage device to read the data from. However, the LBA and block count information in the identified tuple are not used to perform the read operation. Rather, curLBA informs where in the fragment represented by the identified tuple to begin reading data, and numBlksToRead specifies how many blocks of data to read. When isNew is '0', the PBA associated with curLBA will be used on the physical device where the old data object is stored to read numBlksToRead blocks data from the physical device. When isNew is '1', the PBA associated with curLBA will be used on the physical device where the old data object is stored to read numBlksToRead blocks.

At operation 712, the object manager can update the curLBA and numBlksLeft counters for the next iteration of the loop. For instance, the counters can be updated as follows:

$$\text{curLBA} \mathrel{+}= \text{numBlksToRead}$$

$$\text{numBlksLeft} \mathrel{-}= \text{numBlksToRead}$$

Processing can return to the top of the loop for the next iteration. When numBlksLeft reaches 0, processing of the read operation can be deemed complete.

FIGS. 10A-10D show examples of various configurations of a read operation. FIGS. 10A and 10B, for instance, show a read operation in which the requested range of blocks falls entirely within a fragment X. In FIG. 10A, the starting block is the same as the starting block of fragment X, so curLBA=$L_x$ and numBlksToRead=nBlks. In FIG. 10B, curLBA>$L_x$. The read operations in FIGS. 10A and 10B can be processed in one iteration of the loop shown in FIG. 7.

The read operation shown in FIG. 10C shows the requested range of blocks extends beyond fragment X and into fragment Y. Accordingly, fragment X will be read in a first iteration of the loop shown in FIG. 7 and fragment Y will be read in a second iteration. The first iteration will read all or a portion of fragment X depending on the value of startLBA, so curLBA≥$L_x$ and numBlksToRead=$N_x$−(curLBA−$L_x$). The second iteration will read only a portion of fragment Y similar to the configuration shown in FIG. 10B where curLBA=Ly and numBlksToRead=nBlks−($N_x$−(curLBA−$L_x$)).

The read operation in FIG. 10D shows a read operation that spans several fragments. Each fragment is processed in a corresponding iteration of the loop shown in FIG. 7. It can be seen that the entirety of each of fragments B, C, D, and E will be read. The initial fragment A will be read entirely or partially depending on the value of startLBA, and the final fragment F will be read partially similar to the configuration shown in FIG. 10B.

The foregoing has described processing, in accordance with the present disclosure, of read and write operations on a data object whose storage format has been updated from an old format to a new format. The tuples comprising the logical map allow for read and write operations to be performed immediately on either the old data object or the new data object. The logical map allows for the conversion from old format to new format to occur effectively concurrently with the conversion so that the underlying data object does not need to be taken offline to do the conversion thus reducing disruption to the users by maintaining availability during the conversion. For instance, write operations are performed on the new data object, and the logical map is updated to point to the data in the new data object. As read operations are received, the logical map will point (via the isNew flag) to the correct location of the data to be read. Also, IO performance is unaffected, because the logical map allows the read and write operations to correctly and transparently access data in either the old or new data object as the conversion is taking place.

An aspect of processing IOs in accordance with the present disclosure is that conversion begins almost immediately because write operations are made to the new data object and the logical map tracks which logical blocks are on the new data object. Read operations can therefore access the correct location (old or new data object) from which to read the data. The logical map allows the read and write operations on the data object to proceed without requiring the data object to first be fully converted. The present disclosure allows for conversion of a data object without impacting users of the system. A migration process can proceed in the background independently of read and write operations. This allows the migration process to proceed when system resources are available so that the conversion process does not impact system performance.

Figure 11:
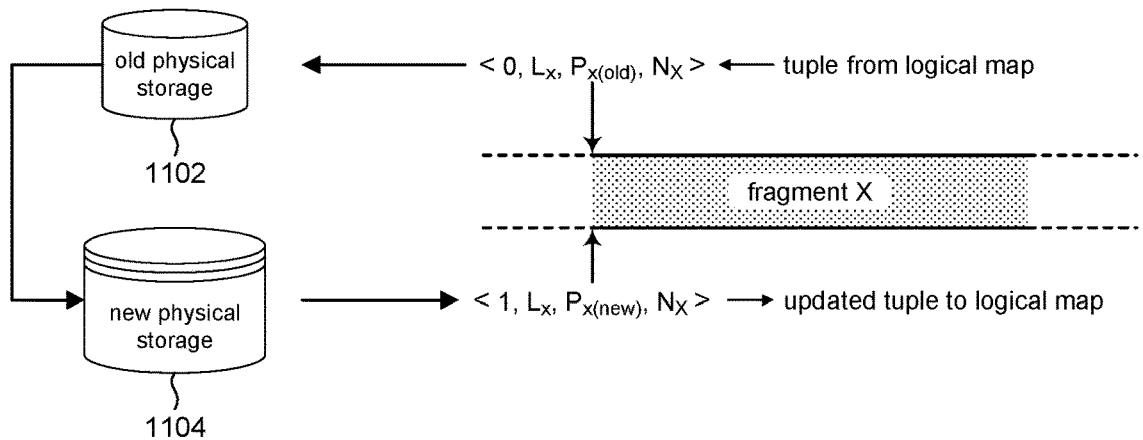
FIGS. 11 and 12 illustrate migration of data in accordance with the present disclosure.
Figure 12:
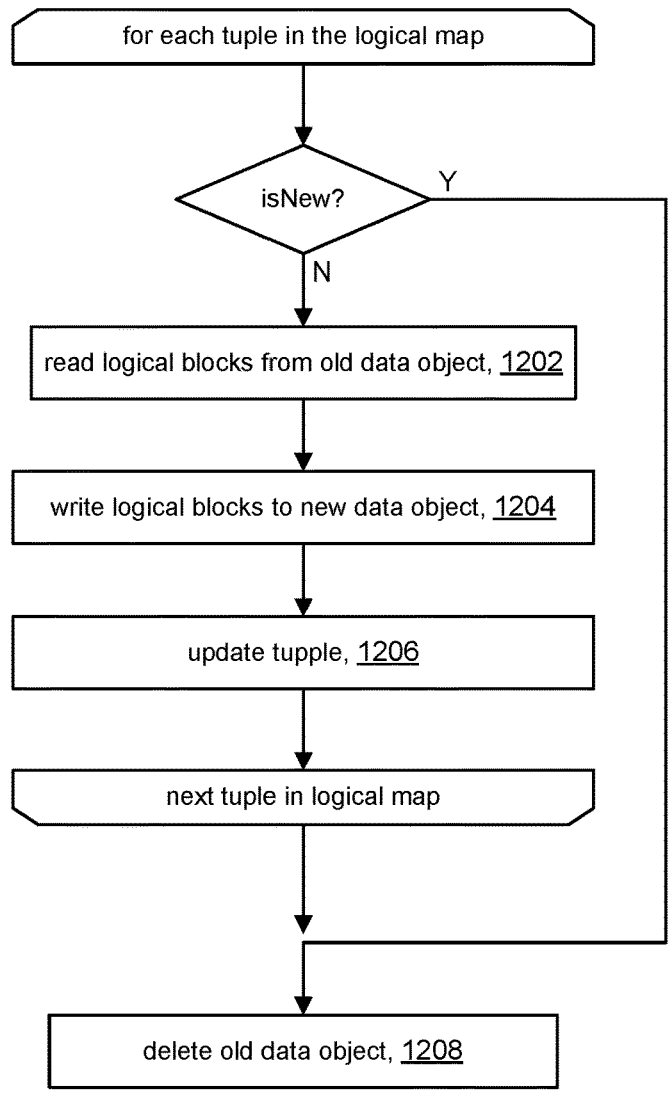

Referring to FIGS. 11 and 12, the discussion will now turn to a high level description of processing in object manager 102 for migrating data from a data object in accordance with the present disclosure to complete the conversion process. Because not all the old logical blocks will necessarily be written to, the migration process ensures that the conversion from the old data object to the new data object eventually completes. In some embodiments, for example, the storage system 100 can include computer executable program code, which when executed by a processor (e.g., 1402, FIG. 14), can cause the object manager to perform processing in accordance with FIG. 11 as a background process.

Referring first to FIG. 11, in some embodiments, background migration (FIG. 1) can be a process that wakes up during quiet periods in storage system 100 so as to minimize or otherwise reduce its impact on the storage system. As shown in FIG. 11, the background migration process can retrieve each tuple from the logical map. For each retrieved tuple whose ISNEW flag is '0' (i.e., identifies an old fragment), the logical blocks can be read from the old data object (e.g., on storage device 1102) and written to the new data object (e.g., on storage device 1104). The ISNEW flag in the retrieved tuple can be set to '1. The PBA in the retrieved tuple can be updated to point to the beginning physical address of the physical blocks on physical storage device 1104 where the new data object is stored.

Referring now to FIG. 12, background migration can access each tuple in the logical map as follows. If the ISNEW flag in the accessed tuple is not set, then processing can continue to operation x02. If the ISNEW flag is set, then the data pointed to by the tuple is already on the new data object and so processing can continue with the next tuple in the logical map.

At operation 1202, the object manager can read each logical block in the fragment identified by the accessed tuple from the data store (e.g., 1102) containing the old data object.

At operation 1204, the object manager can write each logical block that was read in at operation 1202 to the data store (1104) containing the new data object.

At operation 1206, the object manager can perform an update operation on the accessed tuple to update its contents. For example, the ISNEW flag can be set to '1' to show that the logical blocks are now on the new data object, wherein a read operation will access the new data object. The PBA can be updated to point to the beginning physical block in the data store (1104) containing the new data object. Processing can return the top of the loop to process the next tuple in the logical map.

At operation 1208, the object manager can delete the old data object. At this point, every tuple that points to the old data object has been migrated. All the data in the old data object has been written to the new data object. The conversion process can be deemed complete.

Figure 13:
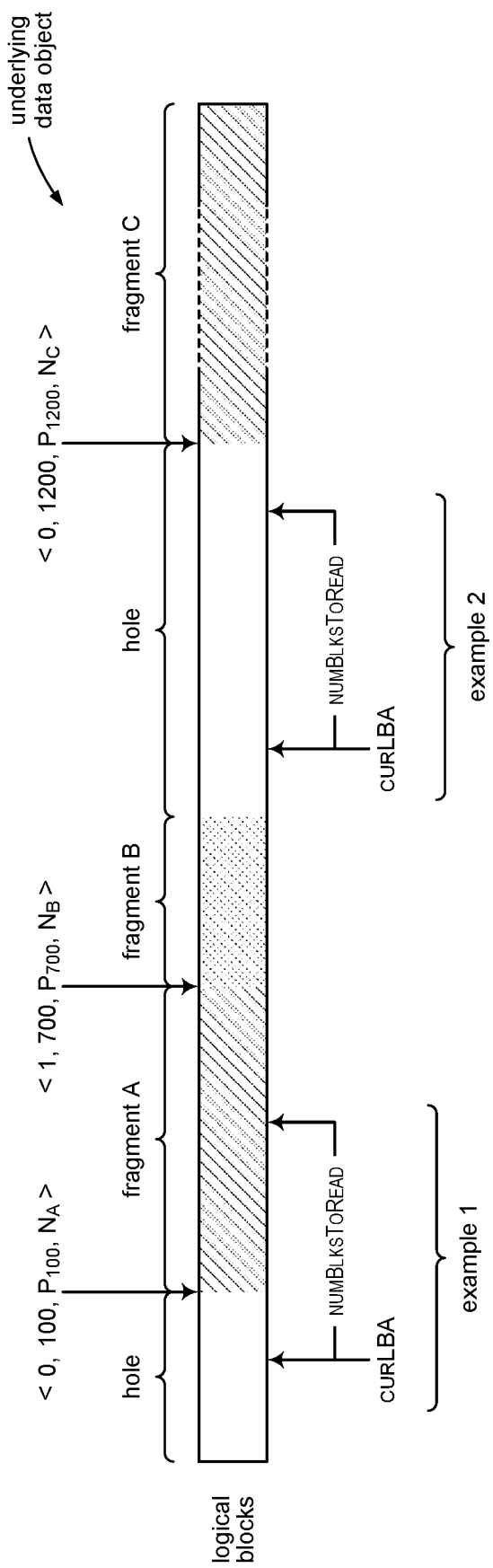
FIG. 13 illustrates the effect of holes in the underlying data object in connection with performing a read operation in accordance with the present disclosure.

Referring to FIG. 13, it was noted above that holes in the underlying data object represent corner cases in connection with identifying a tuple (operation 706) and computing NUMBLKSTOREAD (operation 708). As explained above, holes in the data object can arise when portions of the data object are deleted. FIG. 13 shows a configuration of logical blocks of the underlying data object having a combination of holes, old fragments (fragments A, C), and a new fragment B to explain this aspect of the present disclosure.

FIG. 13 shows two examples to illustrate the effect of holes in the data object. In example 1, there is no tuple that is less than CURLBA because CURLBA falls within a hole. As such, a search of the logical map at operation 706 will result in no tuple being identified.

In example 2, the tuple for fragment B will be identified because the tuple for fragment B,

<1,700,P$_{700}$,N$_B$>, contains the largest LBA that is ≤CURLBA. However, CURLBA is located beyond the boundary of fragment B and because the next tuple is at logical block 1200, CURLBA falls within a hole. In either case, when a hole detected, the object manager can terminate the read operation and return a suitable error code.

Figure 14:
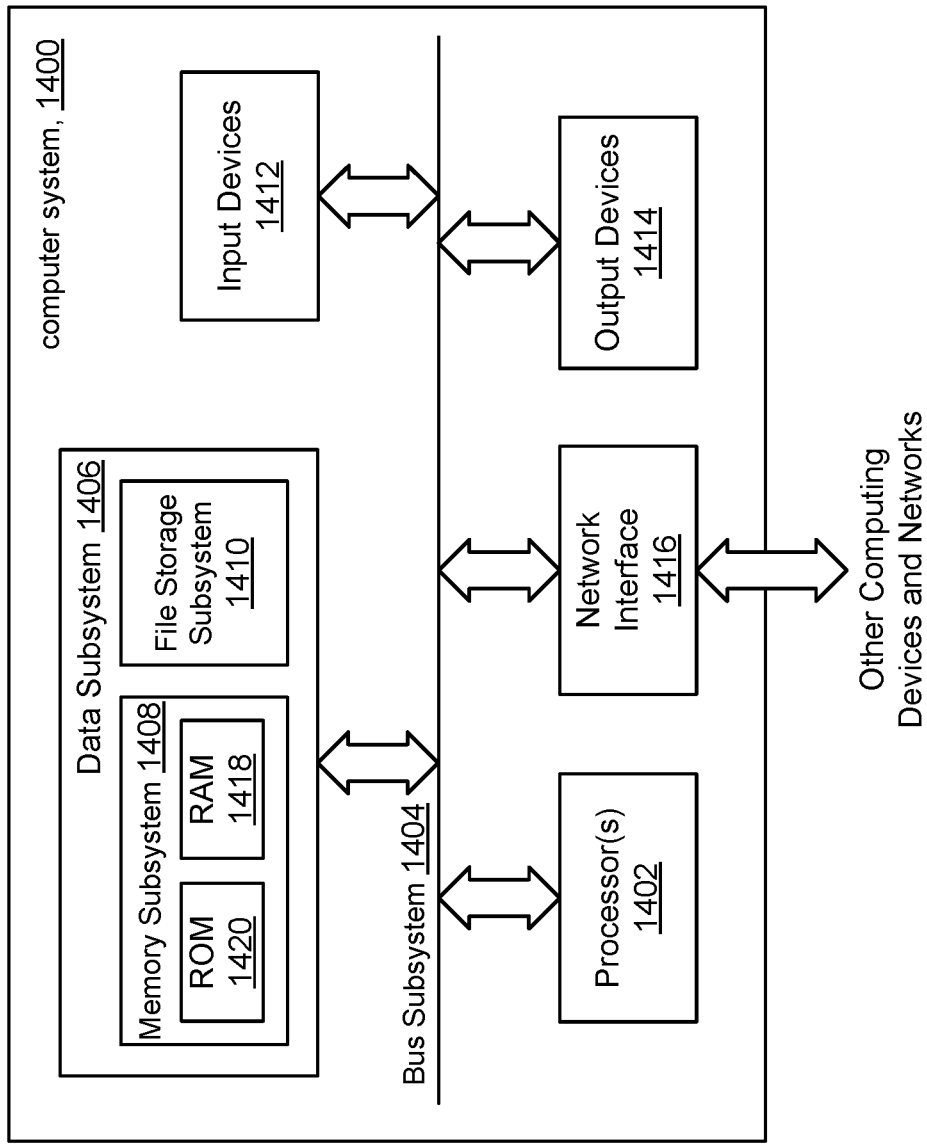
FIG. 14 shows a computer system that can be adapted in accordance with the present disclosure.

FIG. 14 depicts a simplified block diagram of an example computer system 1400 according to certain embodiments. Computer system 1400 can be used to implement storage system 100 described in the present disclosure. As shown in FIG. 14, computer system 1400 includes one or more processors 1402 that communicate with a number of peripheral devices via bus subsystem 1404. These peripheral devices include data subsystem 1406 (comprising memory subsystem 1408 and file storage subsystem 1410), user interface input devices 1412, user interface output devices 1414, and network interface subsystem 1416.

Bus subsystem 1404 can provide a mechanism for letting the various components and subsystems of computer system 1400 communicate with each other as intended. Although bus subsystem 1404 is shown schematically as a single bus, alternative embodiments of the bus subsystem can utilize multiple busses.

Network interface subsystem 1416 can serve as an interface for communicating data between computer system 1400 and other computer systems or networks. Embodiments of network interface subsystem 1416 can include, e.g., an Ethernet card, a Wi-Fi and/or cellular adapter, and the like.

User interface input devices 1412 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1400.

User interface output devices 1414 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1400.

Data subsystem 1406 includes memory subsystem 1408 and file/disk storage subsystem 1410 represent non-transitory computer-readable storage media that can store program code and/or data, which when executed by processor 1402, can cause processor 1402 to perform operations in accordance with embodiments of the present disclosure.

Memory subsystem 1408 includes a number of memories including main random access memory (RAM) 1418 for storage of instructions and data during program execution and read-only memory (ROM) 1420 in which fixed instructions are stored. File storage subsystem 1410 can provide persistent (i.e., non-volatile) storage for program and data files, and can include a magnetic or solid-state hard disk drive, NVMe device, Persistent Memory device, an optical drive along with associated removable media (e.g., CD-ROM, DVD, Blu-Ray, etc.), a removable flash memory-based drive or card, and/or other types of storage media known in the art.

It should be appreciated that computer system 1400 is illustrative and many other configurations having more or fewer components than system 1400 are possible.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
receiving a read operation to read data from a data object;
accessing a plurality of map entries stored in a logical map, the logical map representing fragments of a first version of the data object and fragments of a second version of the data object, each map entry including a flag that is set to indicate whether a fragment is the first version of the data object or the fragment is the second version of the data object; and
reading data from each fragment represented by each of the plurality of accessed map entries including:
when said each accessed map entry includes the flag that is set to indicate a fragment is the first version of the data object, then reading the data from the first version of the data object; and
when said each accessed map entry includes the flag that is set to indicate a fragment is the second version of the data object, then reading the data from the second version of the data object.

2. The method of claim 1, wherein the received read operation specifies a starting logical block L in the data object, the method including: accessing a first map entry from the logical map that represents a fragment containing the starting logical block L; and
reading a portion of data contained the fragment determined based on a location of the starting logical block within the fragment.

3. The method of claim 2, wherein reading a portion of data contained the fragment is further determined based on a remaining number of blocks of the read operation.

4. The method of claim 1, wherein a fragment of the first version of the data object comprises one or more logical blocks of the data object that are stored in the first version of the data object, wherein a fragment of the second version of the data object comprises one or more logical blocks of the data object that are stored in the second version of the data object.

5. The method of claim 1, wherein each map entry in the logical map comprises a logical block address (LBA) of a first logical block in the fragment represented by said each map entry and a block count of the number of blocks in the fragment, wherein accessing the map entry includes searching the plurality of map entries in the logical map for a map entry having the largest logical block address that is equal to or less than the starting block L.

6. The method of claim 1, wherein reading data from the first or second version of the data object includes accessing one or more physical data blocks on a respective data storage device of the first or second version of the data object and using physical block address (PBA) information in the accessed map entry to access the one or more physical data blocks on the respective data storage device.

7. The method of claim 1, wherein the first version of the data object is a virtual disk having a first storage format, wherein the second version of the data object is virtual disk having a second storage format different from the first storage format.

8. A non-transitory computer-readable storage medium having stored thereon computer executable instructions, which when executed by a computer device, cause the computer device to:
receive a read operation to read data from a data object;
access a plurality of map entries stored in a logical map, the logical map representing fragments of a first version of the data object and fragments of a second version of the data object, each map entry including a flag that is set to indicate whether a fragment is the first version of the data object or the fragment is the second version of the data object; and
read data from each fragment represented by each of the plurality of accessed map entries including:
when said each accessed map entry includes the flag that is set to indicate a fragment is the first version of the data object, then reading the data from the first version of the data object; and
when said each accessed map entry includes the flag that is set to indicate a fragment is the second version of the data object, then reading the data from the second version of the data object.

9. The non-transitory computer-readable storage medium of claim 8, wherein the read operation specifies a starting logical block L in the data object, the method including:
accessing a first map entry from the logical map that represents a fragment containing the starting logical block L; and
reading a portion of data contained the fragment determined based on a location of the starting logical block within the fragment.

10. The non-transitory computer-readable storage medium of claim 9, wherein reading a portion of data contained the fragment is further determined based on a remaining number of blocks of the read operation.

11. The non-transitory computer-readable storage medium of claim 8, wherein a fragment of the first version of the data object comprises one or more logical blocks of the data object that are stored in the first version of the data object, wherein a fragment of the second version of the data object comprises one or more logical blocks of the data object that are stored in the second version of the data object.

12. The non-transitory computer-readable storage medium of claim 8, wherein each map entry in the logical map comprises a logical block address (LBA) of a first logical block in the fragment represented by said each map entry and a block count of the number of blocks in the fragment, wherein accessing the map entry includes searching the plurality of map entries in the logical map for a map entry having the largest logical block address that is equal to or less than the starting block L.

13. The non-transitory computer-readable storage medium of claim 8, wherein reading data from the first or second version of the data object includes accessing one or more physical data blocks on a respective data storage device of the first or second version of the data object and using physical block address (PBA) information in the accessed map entry to access the one or more physical data blocks on the respective data storage device.

14. The non-transitory computer-readable storage medium of claim 8, wherein the first version of the data object is a virtual disk having a first storage format, wherein the second version of the data object is virtual disk having a second storage format different from the first storage format.

15. An apparatus comprising:
one or more computer processors; and
a computer-readable storage medium comprising instructions for controlling the one or more computer processors to: receive a read operation to read data from a data object;
access a plurality of map entries stored in a logical map, the logical map representing fragments of a first version of the data object and fragments of a second version of the data object, each map entry including a flag that is set to indicate whether a fragment of the first version is the data object or the fragment the second version is the data object; and
read data from each fragment represented by each of the plurality of accessed map entries including:
when said each accessed map entry includes the flag that is set to indicate a fragment is the first version of the data object, then reading the data from the first version of the data object; and
when said each accessed map entry includes the flag that is set to indicate a fragment is the second version of the data object, then reading the data from the second version of the data object.

16. The apparatus of claim 15, wherein the read operation specifies a starting logical block L in the data object, the method including:
accessing a first map entry from the logical map that represents a fragment containing the starting logical block L; and
reading a portion of data contained the fragment determined based on a location of the starting logical block within the fragment.

17. The apparatus of claim 16, wherein reading a portion of data contained the fragment is further determined based on a remaining number of blocks of the read operation.

18. The apparatus of claim 15, wherein each map entry in the logical map comprises a logical block address (LBA) of a first logical block in the fragment represented by said each map entry and a block count of the number of blocks in the fragment, wherein accessing the map entry includes searching the plurality of map entries in the logical map for a map entry having the largest logical block address that is equal to or less than the starting block L.

19. The apparatus of claim 15, wherein reading data from the first or second version of the data object includes accessing one or more physical data blocks on a respective data storage device of the first or second version of the data object and using physical block address (PBA) information in the accessed map entry to access the one or more physical data blocks on the respective data storage device.

20. The apparatus of claim 15, wherein the first version of the data object is a virtual disk having a first storage format, wherein the second version of the data object is virtual disk having a second storage format different from the first storage format.

* * * * *